United States Patent Office 3,708,505
Patented Jan. 2, 1973

3,708,505
PROCESS FOR PREPARATION OF
d,l-ALPHA TOCOPHEROL
Sheldon B. Greenbaum, Livingston, N.J., and Walter Hacke, New York, and Herman Horn, Staten Island, N.Y., assignors to Diamond Shamrock Corporation, Cleveland, Ohio
No Drawing. Filed Feb. 25, 1971, Ser. No. 119,048
Int. Cl. C07d 7/22
U.S. Cl. 260—345.5                                 8 Claims

ABSTRACT OF THE DISCLOSURE

D,l-alpha-tocopherol is prepared by reacting trimethylhydroquinone (TMHQ) and isophytol in the presence of a combined acid condensation agent which comprises a Lewis acid and at least one strong acid, which combined acids act in a synergistic manner. A typical example of a useful Lewis acid is zinc chloride. Typical examples of strong acids are p-toluene sulfonic acid and sodium bisulfate.

BACKGROUND OF THE INVENTION

(1) Field of the invention

This invention relates to an improved process for manufacturing d,l-alpha-tocopherol.

(2) Description of the prior art

The preparation of d,l-alpha-tocopherol by the condensation of trimethylhydroquinone and phytol or derivatives thereof in the presence of solvents and an acid condensing agent is well known in the art. The acid catalyst used in the prior art may be either a Lewis acid such as zinc chloride, boron tribromide, etc., or strong inorganic acids such as sulfuric acid, hydrochloric acid, etc., or strong organic acids such as p-toluene sulfonic acid.

SUMMARY OF THE INVENTION

It has unexpectedly been discovered that by combining two individually known acid condensation agents in the known process for producing d,l-alpha-tocopherol, an improved product is obtained. The combined agents unexpectedly act in a synergistic manner which results in a product superior to that produced by using any one of them separately. In this improved process, trimethylhydroquinone and an inert organic solvent are charged into a reaction vessel together with a combination of at least one Lewis acid and at least one strong inorganic acid or strong organic acid and are heated to reflux. Isophytol is then slowly added and when addition is completed the reaction mass is refluxed for a sufficient time to produce d,l-alpha-tocopherol. Optionally, acetic anhydride may be added to produce d,l-alpha-tocopheryl acetate. It is an advantage of the present process that the synthesis is essentially a one-step process and that a yield of high quality d,l-alpha-tocopherol is produced.

DESCRIPTION OF THE PREFERRED EMBODIMENTS

The phytol may be phytol, isophytol, phytadiene, phytyl chloride, phytyl bromide, phytyl acetate, phytyl methyl ether, phytol derivatives, substituted phytol, and the like. The preferred phytol is isophytol.

Inert organic solvents which may be employed in the present invention are those solvents boiling below the boiling points of the reactants and the desired product. Suitable inert solvents include the aliphatic hydrocarbon solvents of 5 to 12 carbon atoms, or more, as for example, n-heptane; carboxylic acids having 2 to 6 carbon atoms such as acetic acid, propionic acid, butanoic acid, and hexanoic acid; aromatic solvents such as xylene, benzene, and toluene; ethers such as isopropyl ether, dioxane, tetrahydrofuran; and the like.

The acid condensation catalyst of this invention must consist of a combination of two acids, one of which must be a Lewis acid and the other a strong acid which may be organic or inorganic.

Suitable Lewis acids include boron trifluoride, boron tribromide, aluminum chloride, aluminum bromide, zinc chloride, boron trifluorodiphosphoric acid complex, and the like. The preferred Lewis acid is zinc chloride.

Suitable strong acids include sulfuric acid, hydrochloric acid, nitric acid, para-toluene sulfonic acid, sodium bisulfate, mixtures thereof, and the like. Preferred strong acids are sulfuric acid, para-toluene sulfonic acid and sodium bisulfate. An especially preferred strong acid is sodium bisulfate.

The ratio of ingredients is from about 0.9 to 1.1 mole (and preferably about 1.0 mole) of trimethylhydroquinone to about 0.9 to 1.1 mole (and preferably about 1.0 mole) of phytol or substituted phytol reacted in the presence of 0.1 to 1.5 mole (and preferably 0.35 to 0.75 mole) of combined acid condensation agent. The amount of solvent present may vary, the minimal amount necessary being that amount sufficient for the reaction to take place. The ratio of Lewis acid to strong acid should be from 1 to 3 moles Lewis acid to 1 mole strong acid. Generally, an inferior product is obtained if the amount of strong acid exceeds the amount of the Lewis acid. A preferred set of molar ratios where the combined acid condensation agent consists of zinc chloride and sodium bisulfate, for example, would be 1.0 mole of trimethylhydroquinone, 1.0 mole of isophytol, and 0.575 mole of combined acid condensation agent, whose components are 0.3675 mole of zinc chloride and 0.2075 mole of sodium bisulfate. The amount of combined acid condensation agent to be used may vary somewhat with the desired reaction time. Thus, more combined acid condensation agent may be used where a faster reaction is desirable, although the preferred maximum is 0.75 mole. Conversely, a smaller amount of combined acid condensation agent may be used where it is desired to slow down the reaction although the preferred minimum is 0.35 mole.

The general process of manufacture is for the trimethylhydroquinone to be charged into a reaction flask together with the combined acid condensing agent and the solvent. The mixture is then heated at 50° to 150° C. and isophytol is added slowly over a two to six hour period. The reaction mass is then further heated at 50–150° C. for from six to twenty-four hours. When the reaction is completed the mass may be purified by distillation if so desired. One of the useful and unexpected results of using the combined acid condensing agent is that the d,l-alpha-tocopherol produced is of about 80–95% purity, which meets feed grade standards. Purification is therefore only required if the product is to meet National Formulary standards. Alternately, acetic anhydride may be added to produce d,l-alpha-tocopherol acetate.

For a fuller understanding of the nature and objects of this invention, reference may be made to the following examples which are given merely to illustrate the invention and are not to be construed in a limiting sense. All weights, proportions, and percentages, are on a weight basis unless otherwise indicated. All temperatures are ° C. unless otherwise indicated.

EXAMPLE I 62.6 g. (0.4 mole of 98% purity) trimethylhydroquinone, 20.0 g. (0.147 mole) of zinc chloride, 10.0 g. (0.083 mole) sodium bisulfate and 240 ml. of benzene were charged into a one liter three-neck reaction flask. The first neck of the flask was equipped with a thermometer, the second with a mechanical agitator, and the third neck was connected to a Dean-Stark distillation receiver which was in turn connected to a reflux condenser. The reaction flask containing the above ingredients was heated to gentle reflux (74–76° C.). 127.4 g. (0.4 mole of 96.1% purity) isophytol were slowly added over a 2.5 hour period. Thereafter, the reaction mass was heated at reflux (84–86° C.) for 16 hours and cooled to room temperature. 85.0 g. (0.83 mole) of acetic anhydride was then added and the reaction mass was again brought to reflux and maintained at that temperature for 6 hours. After cooling the reaction mass was washed with 200 ml. of 10% brine and the washing was then repeated two more times with 160 ml. of 10% brine. The organic layer was then dried over $Na_2SO_4$ and the solvent stripped off at 60–70° C. The residue weighed 197.8 g. and was 89.5% pure d,l-alpha-tocopheryl acetate as determined by gas chromatography. This yield corresponded to 93.6% of the theoretical maximum recovery.

EXAMPLE II

Example I was repeated with all ingredients in the same proportions except that in place of sodium bisulfate, 3.7 g. of concentrated sulfuric acid was used. This yielded 89.5% of 80% pure d,l-alpha-tocopheryl acetate.

EXAMPLE III

Example I was repeated with all ingredients in the same proportions except that in place of sodium bisulfate, 8.0 g. of para-toluene sulfonic acid was used. This yielded 91.0% of 86.3% pure d,l-alpha-tocopheryl acetate.

EXAMPLE IV

Example I was repeated with all ingredients in the same proportions except that in place of sodium bisulfate, 20 ml. of 37% of hydrochloric acid was used. This yielded 68% of 64% pure d,l-alpha-tocopheryl acetate.

TABLE I

Summary of the Results of Examples I–IV

The following table illustrates the comparative merits of various strong acids combined with a Lewis acid (zinc chloride) for achieving the purposes of this invention.

| Strong acid | Percent yield | Percent purity |
|---|---|---|
| Sodium bisulfate | 93.6 | 89.5 |
| Para-toluene sulfonic acid | 91.0 | 86.3 |
| Sulphuric acid | 89.5 | 80.0 |
| Hydrochloric acid | 68.0 | 64.0 |

In the above table, which is based upon Examples I–IV, it is clearly indicated that sodium bisulfate yields a superior product and that para-toluene sulfonic acid and sulphuric acid yield acceptable products. All three of these are superior to the prior art in that a product of high purity is obtained and in that the percentage yield minimizes the waste of raw materials which occurs in many of the processes of the prior art.

EXAMPLE V 62.6 g. of trimethylhydroquinone, 20.0 g. of zinc chloride, 2.0 g. of sodium bisulfate, and 240 ml. of benzene were charged into a reaction flask and heated to reflux (80–85° C.). Heating was continued and 127.4 g. of isophytol were added over a two hour period. The reaction mass was further refluxed for 15 hours and then cooled, to produce d,l-alpha-tocopherol.

EXAMPLE VI 30.9 g. of trimethylhydroquinone, 10.0 g. of zinc chloride, 4.0 g. of p-toluene sulfonic acid, and 80 ml. of benzene were charged into a reaction flask and heated to reflux (80–85° C.). While maintaining the mixture at reflux temperature, 57.0 g. of isophytol were added over a two hour period. The reaction mass was further refluxed for fifteen hours and then cooled. The product thus produced was d,l-alpha-tocopherol.

We claim:

1. In a process for the manufacture of d,l-alpha-tocopherol comprising the condensation of trimethylhydroquinone with a phytol in the presence of an acid condensing agent and an inert solvent, the improvement comprising using a combined acid condensing agent that consists of a Lewis acid and at least one strong acid.

2. The improved process according to claim 1 in which the Lewis acid is zinc chloride.

3. The improved process according to claim 1 in which the strong acid is selected from at least one of a group consisting of sodium bisulfate, sulfuric acid and para-toluene sulfonic acid.

4. The improved process according to claim 1 in which the strong acid is sodium bisulfate.

5. The improved process according to claim 1 in which the Lewis acid is zinc chloride and the strong acid is sodium bisulfate.

6. The improved process according to claim 1 in which about 1.0 mole of trimethylhydroquinone is condensed with about 1.0 mole of isophytol in the presence of from about .35 to about .75 mole of combined acid condensing agent.

7. The improved process according to claim 6 in which the ratio of the combined acid condensing agent is from about 1 to about 3 mole Lewis acid to about 1 mole strong acid.

8. The improved process according to claim 1 in which acetic anhydride is reacted with the d,l-alpha-tocopherol to produce d,l-alpha-tocopheryl acetate.

References Cited

UNITED STATES PATENTS 3,459,773  8/1969  Moroe et al. _____ 260—345.5
3,476,772  11/1969  Hoyle et al. _____ 260—345.5

JOHN M. FORD, Primary Examiner